United States Patent [19]

Williams

[11] Patent Number: 5,539,454
[45] Date of Patent: Jul. 23, 1996

[54] VIDEO EVENT TRIGGER AND TRACKING SYSTEM USING FUZZY COMPARATORS

[75] Inventor: Glenn L. Williams, Bay Village, Ohio

[73] Assignee: The United States of America as represented by the Administrator, National Aeronautics and Space Administration, Washington, D.C.

[21] Appl. No.: 386,999

[22] Filed: Feb. 6, 1995

[51] Int. Cl.⁶ .................................................. H04N 5/225
[52] U.S. Cl. ........................... 348/169; 348/155; 348/701
[58] Field of Search ................................... 348/169, 172, 348/170, 155, 700, 701; H04N 5/225

[56] References Cited

U.S. PATENT DOCUMENTS

| | | |
|---|---|---|
| 3,885,090 | 5/1975 | Rosenbaum . |
| 4,364,089 | 12/1982 | Woolfson ................................. 348/169 |
| 4,449,144 | 5/1984 | Suzuki . |
| 4,458,266 | 7/1984 | Mahoney . |
| 4,677,476 | 6/1987 | Kondo . |
| 4,737,847 | 4/1988 | Araki et al. . |
| 4,811,092 | 3/1989 | Achiha et al. . |
| 4,853,775 | 8/1989 | Rouvrais et al. . |
| 4,855,825 | 8/1989 | Santamaki et al. . |
| 4,857,912 | 8/1989 | Everett, Jr. et al. . |
| 5,034,811 | 6/1991 | Palm ....................................... 348/155 |
| 5,175,694 | 12/1992 | Amato ..................................... 348/169 |
| 5,243,418 | 9/1993 | Kuno et al. .............................. 348/170 |

OTHER PUBLICATIONS

Technology 2001, The Second National Technology Transfer Conference and Exposition, Dec. 3–5, 1991, San Jose, CA, Conference Proceedings, Sponsored by NASA, the Technology Utilization Foundation and Nasa Tech Briefs Magazine, Publication 3136, vol. 1, pp. 254–260.

R&T 1991 Research & Technology, NASA, Lewis Reserch Center, Cleveland, OH, Technical Memorandum 105320, p. 136.

*Primary Examiner*—Victor R. Kostak
*Assistant Examiner*—Juan G. Acosta
*Attorney, Agent, or Firm*—Vernon E. Williams; Kent N. Stone

[57] ABSTRACT

A video observation method and apparatus, the apparatus having a frame storage mechanism, a dividing mechanism, a plurality of fuzzy comparators and a trigger signal mechanism. The frame storage mechanism stores at least one non-current video frame of a viewing field. The dividing mechanism divides a current video frame of the viewing field and the at least one non-current video frame into a plurality of corresponding trigger sections. The plurality of fuzzy comparators each compare and detect a fuzzy logic difference between one trigger section of the current video frame and the corresponding trigger sections of the at least one non-current video frame, the number of fuzzy comparators being selected so that every trigger section of the current video frame is compared. The trigger signal mechanism provides a trigger signal when a fuzzy logic difference is detected between any of the corresponding current and non-current trigger sections. A video observation mechanism and data reducing mechanism may be included with the above apparatus or alone with only a frame storage mechanism, a single generic comparator and a trigger signal mechanism. The video observation mechanism provides a video data stream, wherein each pixel of each frame of a viewing field is provided as multiple bits of data. The data reducing mechanism reduces each set of multiple bits of data which correspond to each pixel to one bit of binary data based on whether the pixel has a level of grey which is above or below a threshold level of grey.

17 Claims, 4 Drawing Sheets

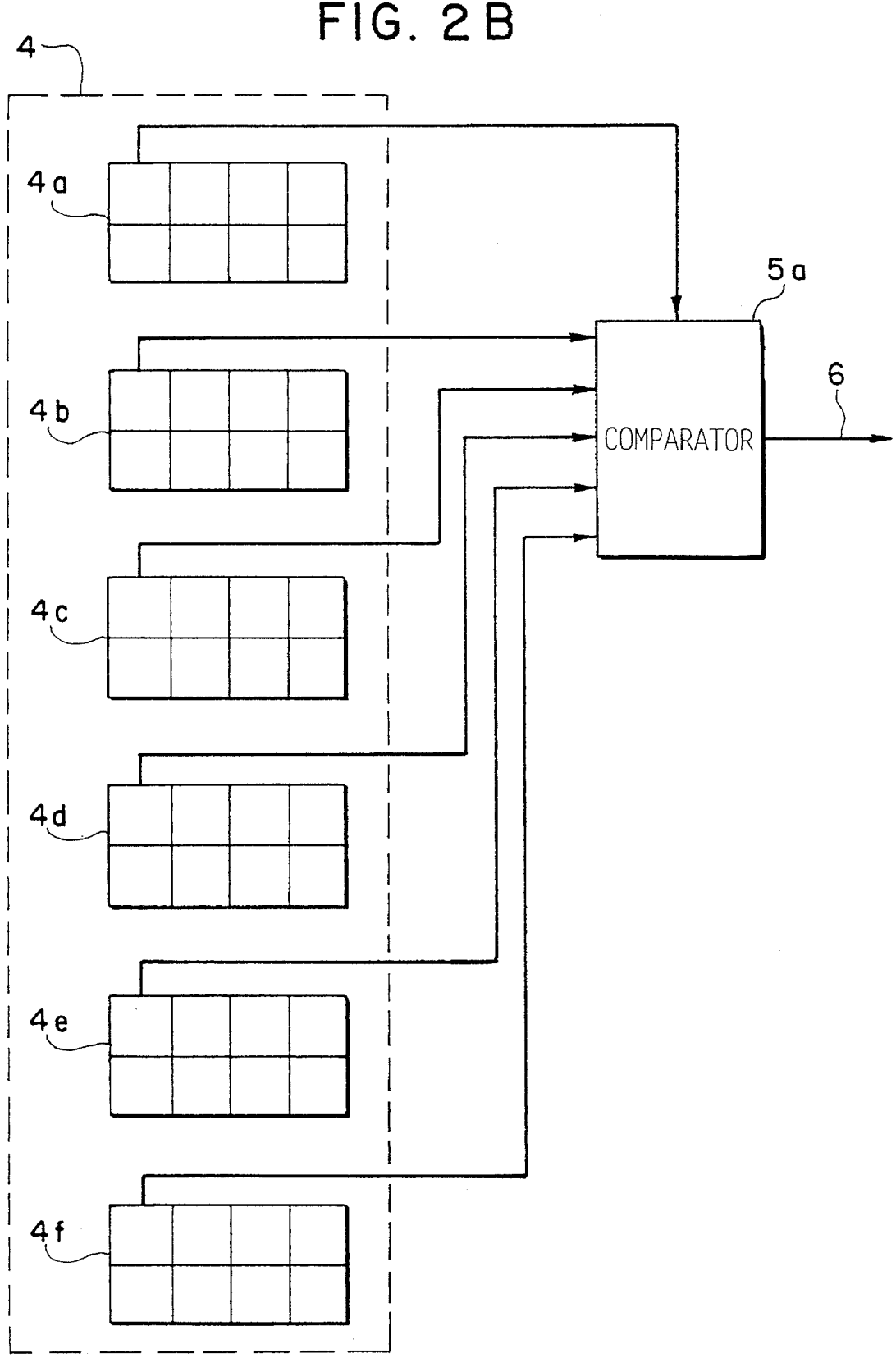

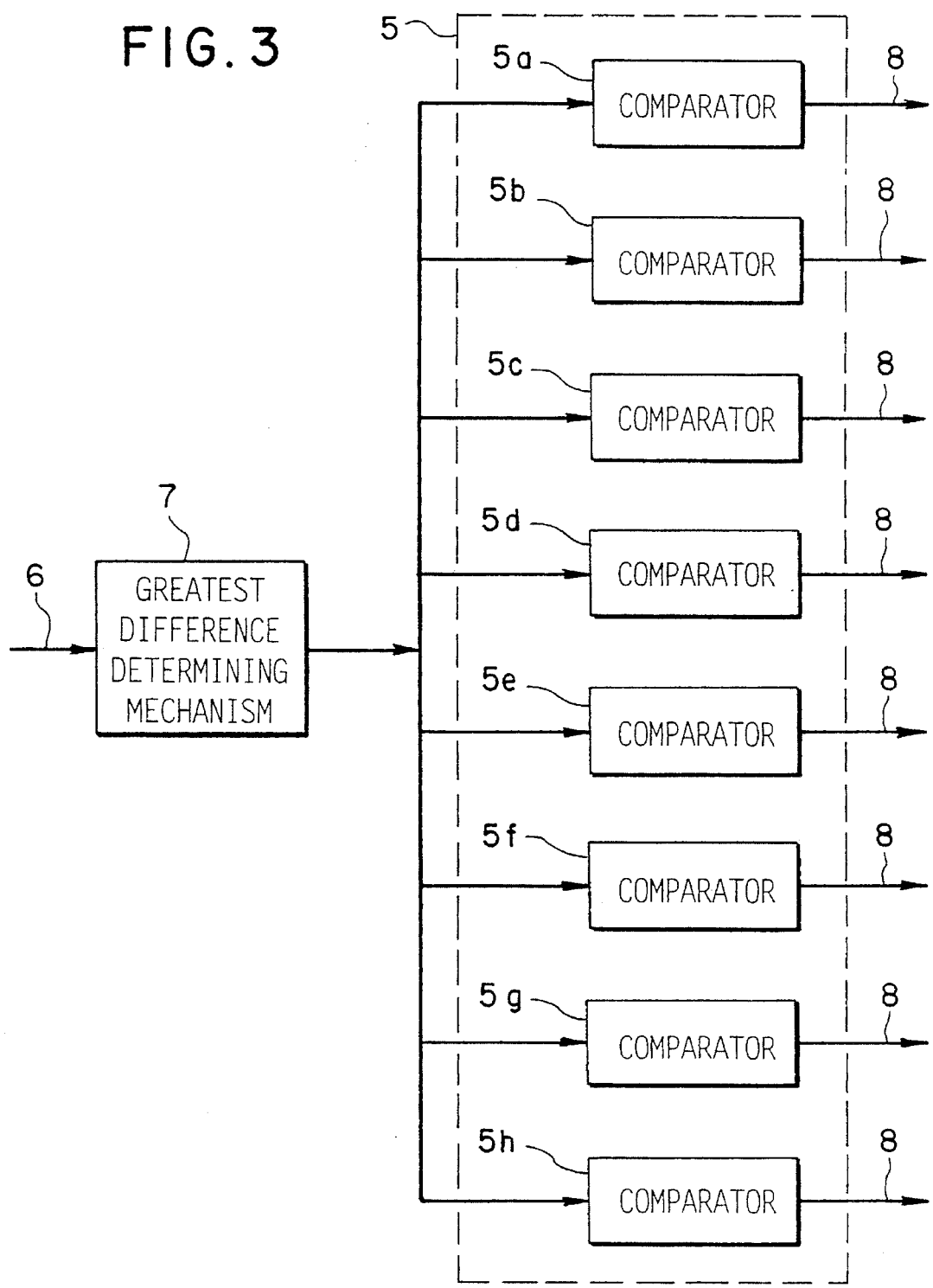

VIDEO EVENT TRIGGER AND TRACKING SYSTEM USING FUZZY COMPARATORS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates to the video monitoring of a viewing field in general. More particularly, the present invention relates to providing a video event trigger when motion is detected and further to tracking motion.

2. Description of Related Art

Video camera technology is the primary mode of monitoring and data acquisition in countless industrial and scientific settings. In many applications, there is a need to know almost immediately when a change occurs within the viewing field so that prompt action can be taken. For example, there may be a need to know when someone is about to enter a hazardous area or when a fire has occurred so that immediate action can be taken. In many of these settings, human observation is simply not adequate because there are extended periods of redundant images not of interest which are only rarely interrupted by an event of interest. Human observation, in such a case, would not only be prohibitively expensive, but could also result in a late or missed triggering. This is especially true considering the boredom associated with such monitoring.

Therefore, there is a need for low cost equipment which can promptly provide an immediate trigger signal. Such equipment is also useful in triggering the start of video recording equipment in a monitoring situation where it is impossible to continuously record the video field.

Even with the current video camera technology, a huge amount of data is produced for every video frame. The video images are presented as long sequences of analog signal voltages per the EIA RS-170 or other standard. Each sequence represents one scan of pixels in a raster line across the video scene, and a multitude of sequences represents one video image, or frame. Pixels are laid out in a video screen in columns and rows (raster lines) with, for example, 480 rows and 512 columns. As a "frame grabber" acquires a sequence of raster lines which represent a video frame, the signal is digitized in an analog-to-digital converter. With a monochromatic ("black and white") system, each digitized pixel is really one byte (8 bits) of information. Therefore, in one frame of a 480 by 512 screen, there almost 2 million bits. As pixels get smaller, i.e., more rows and columns, with newer camera technology, the data per frame increases by a corresponding amount.

There is a need for the capability to produce a video event trigger which can keep up with the video frames as fast as they are produced. The standard frame rate in the United States is 30 frames per second, but new video technology is advancing towards a capability of 1000 frames per second. Even at 30 frames per second, almost 60 million bits of information are created every second for a 480 by 512 frame. Acquiring the ability to correctly and quickly analyze this information poses quite a problem.

In the past, computers have been used to provide video event triggers based on a software algorithm. However, even the fastest computing devices require many tens of milliseconds, to seconds, to analyze the millions of bytes in order to determine whether something interesting has occurred. To achieve faster speeds a very expensive machine is necessary. However, even the best computers are not fast enough. Furthermore, for many applications the volume of the computer (cabinet, memory, etc.) consumes too much space. However, the technology to build the algorithms into silicon gate structures, which require less space and are faster, is too expensive for the small business budget.

Recently, it has been proposed to use a low cost commercially available "fuzzy comparator" chip such as that marketed by Chip Supply Corporation of Florida, formerly Chip Design Corporation, for supplying a video event trigger. According to the manufacturer, this chip utilizes fuzzy logic and neural network technology to evaluate a 20 MHz videotape data stream. However, with only one of these, the hardware approach cannot keep up with the huge onslaught of data.

In the field of camera steadying, a process has been developed to split the viewing field to enable a computer software process to steady the video image. Such a process is used, for example, to remove the inherent vibrations present when video taping from a moving vehicle. However, this method is not directed to providing a video event trigger, and is not concerned with speeding up the process.

SUMMARY OF THE INVENTION

Accordingly, it is an object of the present invention to provide a low cost video observation method and apparatus which does not require human intervention.

It is a further object of the invention to provide a video observation method and apparatus which provides a trigger signal soon after the video event occurs, within only a few frames of the video event, and which can approximately keep up with faster frame rates being developed by industry, up to several hundred frames per second.

It is still a further object of the present invention to provide a video observation method and apparatus which can track where the motion is occurring.

These and other objects are accomplished through the use of a video observation method and apparatus, the apparatus having a frame storage mechanism, a dividing mechanism, a plurality of fuzzy comparators and a trigger signal mechanism. The frame storage mechanism stores at least one non-current video frame of a viewing field. The dividing mechanism divides a current video frame of the viewing field and at least one non-current video frame into a plurality of corresponding trigger sections. The plurality of fuzzy comparators each compare and detect a difference between one trigger section of the current video frame and the corresponding trigger sections of the at least one non-current video frame, the number of fuzzy comparators being selected so that every trigger section of the current video frame is compared. The trigger signal mechanism provides a trigger signal when a difference is detected between any of the corresponding current and non-current trigger sections. A video observation mechanism and data reducing mechanism may be included with the above apparatus or with only a frame storage mechanism, a single generic comparator and a trigger signal mechanism. The video observation mechanism provides a video data stream, wherein each pixel of each frame of a viewing field is provided as eight bits of data. The data reducing mechanism reduces each data byte (eight bits of data) which corresponds to each pixel, to one bit of binary data based on whether the numerical value of the pixel is above or below a programmed numerical threshold level of grey.

BRIEF DESCRIPTION OF THE DRAWINGS

The present invention will be understood from the description herein, with reference to the accompanying drawings, in which:

FIG. 2B is a block diagram of a preferred embodiment of the present invention for explaining how each fuzzy comparator compares corresponding tracking sections; and FIG. 3 is a block diagram of a preferred embodiment of the present invention for explaining the motion tracking method and apparatus.

DETAILED DESCRIPTION OF THE PREFERRED EMBODIMENT

In accordance with the following, it was realized that the speed at which a video event trigger is provided could be improved by dividing the viewing field, in a manner somewhat similar to the way the screen was divided in the past to steady the image when video recording, and then separately comparing the individual sections using fuzzy comparators.

It was also realized that the speed at which a video event trigger is provided could be further improved if the stream of digital data was reduced from eight bits per pixel to one bit per pixel.

Figure 1:
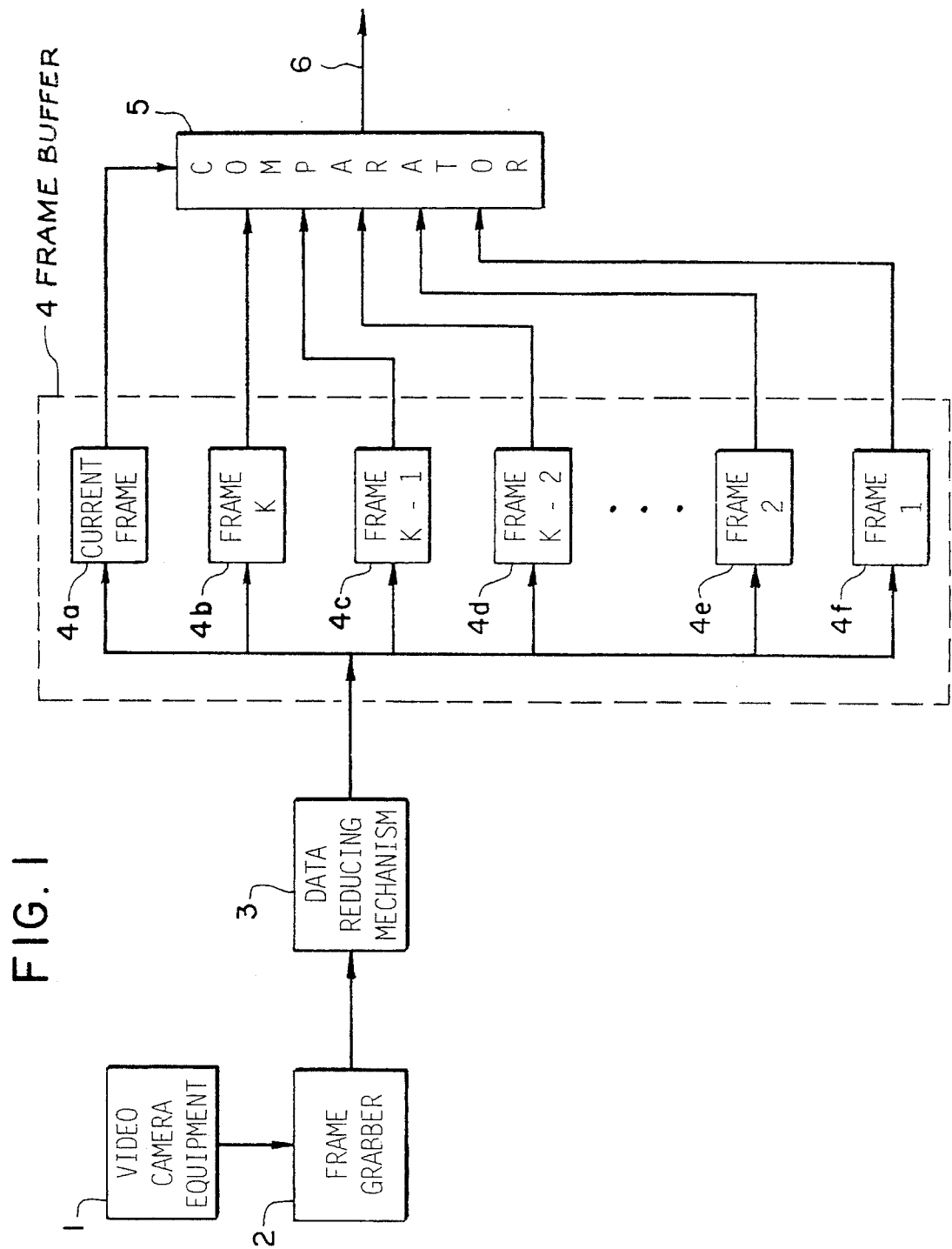
FIG. 1 is a block diagram of a preferred embodiment of the present invention for explaining the frame storage device.

FIG. 1 is a block diagram of a preferred embodiment of the present invention for explaining the frame storage device. As shown in FIG. 1, the video observation apparatus includes video camera equipment 1. The signal from the video camera equipment 1 is supplied as an analog signal to a frame grabber 2 which groups sequences of raster lines which represent a video frame. The frame grabber also has an analog-to-digital converter so that the signal supplied to a data reducing mechanism 3 is an eight bit (one byte) digital signal. The video camera equipment and the frame grabber together are herein referred to as a video observation mechanism.

The data reducing mechanism 3 converts the eight bit per pixel digital signal received from the frame grabber into a one bit per pixel digital signal. This is done by inputing to the data reducing mechanism 3 a threshold level of grey. All pixels received from the frame grabber which are above the threshold level of grey are reduced to a logical ONE. All other levels of grey are reduced to a logical ZERO. (If the signal is originally supplied as a color signal, it is viewed as a black and white signal, in a manner similar to how a black and white TV displays a color broadcast.)

By the above procedure the data reducing mechanism reduces the digital signal input data rate thereto by a factor of eight, and effectively converts the images to "half-tone" quality images. This in turn increases the processing speed of the signal in the elements receiving the signal by eight times.

The one-bit-per-pixel digital signal from the data reducing mechanism 3 is supplied to a frame buffer 4. The frame buffer 4 stores K number of non-current frames 4b to 4f and supplies them, along with the current frame 4a to the fuzzy comparators 5. In each of the comparators 5 (one shown), the one current frame 4a is compared with the plurality of non-current frames 4b to 4f. As will be described more fully later, the fuzzy comparators 5 produce a trigger signal 6 when "differences" are detected. "Difference" is defined as a decision by the fuzzy comparators as to the degree of mismatch between the current video frame and the non-current video frame(s). Although referred to as a difference, the answer is not a strict arithmetic difference.

The frame buffer 4 shown in FIG. 1 stores four or more non-current frames 4b to 4f. Although five frames are shown, four frames are preferably stored. In this case the non-current frame 4f would not be present. The fuzzy comparators are capable of handling up to eight non-current frames. There are two methods for storing frames in the frame buffer 4 depending on whether slow changes in the surroundings need to be detected by the equipment.

If there is no need for a trigger signal 6 to be produced in response to slow changes, then the frames stored in the buffer are constantly updated. When a new frame is acquired, the previously current frame 4a is moved to the K frame 4b, all frames are moved down one, (for example the K frame 4b is moved to the K-1 frame 4c), and the oldest frame 4f is discarded.

If a trigger signal 6 needs to be produced in response to slow changes, then the current frame cannot be compared with the most recent non-current frames because the current and non-current frames would be too similar for the fuzzy comparators 5 to detect a difference. Therefore, the non-current frames 4b to 4f stored in the frame buffer are never updated and the frame buffer contains images of the viewing field as it was when the monitoring process was initiated.

Figure 2A:
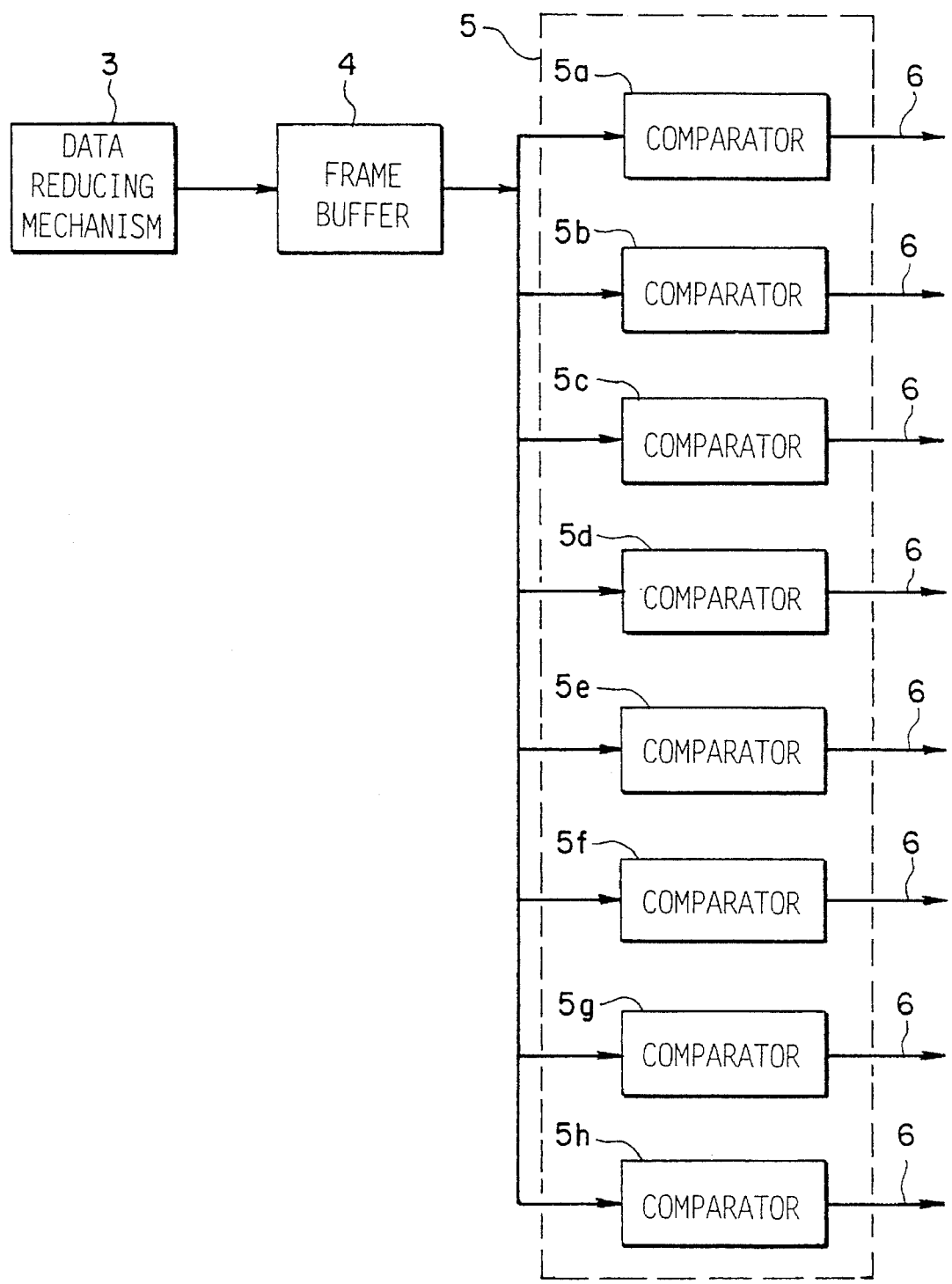
FIG. 2A is a block diagram of a preferred embodiment of the present invention for explaining the plurality of fuzzy comparators.

FIG. 2A is a block diagram of a preferred embodiment of the present invention for explaining the plurality of fuzzy comparators. Preferably, as shown in FIG. 2A, there are a plurality of comparators 5a to 5h to which the frame buffer is connected. As mentioned above, each fuzzy comparator compares the current frame with the plurality of non-current frames. It was found that the video observation apparatus worked particularly well with eight fuzzy comparators 5a to 5h.

FIG. 2B is a block diagram of a preferred embodiment of the present invention for explaining how each fuzzy comparator compares the current 4a and non-current 4b to 4f frames. As can be seen from the figure, each frame is divided into a plurality of sections, for example eight sections are shown. These sections are referred to as "trigger sections". The number of trigger sections corresponds to the number of fuzzy comparators, and is, for example, eight.

Each fuzzy comparator compares one trigger section of the current frame 4a with the corresponding trigger sections of the non-current frames 4b to 4f. For example, a first fuzzy comparator 5a is shown in Figure 2A and it could compare the top right corner of current frame 4a with the top right corners of the non-current frames 4b to 4f. Although the other fuzzy comparators are not shown in FIG. 2A, they would function in a similar manner with the other trigger sections.

According to the present invention, it is also possible to track where the motion is occurring. As described above, during the monitoring process the screen is divided into trigger sections, each trigger section being compared by one comparator. Once a trigger signal has been provided by one of the comparators, the motion of the object which caused the trigger signal can be tracked. In addition, once a trigger signal has been provided by one of the comparators, this signal can be coupled by electrical means to external hardware as a "video event trigger".

FIG. 3 is a block diagram of a preferred embodiment of the present invention for explaining the motion tracking method and apparatus. As shown in FIG. 3, a greatest difference detecting mechanism 7 is connected to each of the fuzzy comparators 5 to receive the one or more trigger signals 6 produced thereby. The greatest difference detecting mechanism 7 is most important when more than one fuzzy comparator detects a difference, i.e., motion, in the trigger sections it is comparing. In this case, the greatest difference detecting mechanism determines which fuzzy comparator has detected the most motion.

After it is determined which trigger section has the most motion, that trigger section is similarly divided into a plurality of tracking sections, the number of tracking sections being again equal to the number of fuzzy comparators. Both the current and corresponding non-current greatest motion trigger sections are similarly divided. Then, in the same manner that the trigger sections were supplied to the fuzzy comparators, each of the tracking sections is respectively supplied to one fuzzy comparator 5a to 5h. The fuzzy comparators 5a to 5h then look for differences between the current and non-current tracking sections. Another greatest difference detecting mechanism is connected to each of the fuzzy comparators 5 to receive the one or more signals 8 produced thereby. In this case the greatest difference detecting mechanism further determines which of the tracking sections detected the most motion, and produces a tracking signal. By doing this, it is possible to very closely track where the most motion is occurring with a tracking signal. When there are eight fuzzy comparators being used, motion is tracked to 1/64th of the entire viewing field. This is because the viewing field (frame) was initially divided into eight trigger sections, one of which was later divided into eight tracking sections. Of course, should no motion be detected in any of the trigger sections, there would be no division into tracking sections.

It is advantageous to divide the trigger section so that the resultant tracking sections are generally square. For example if the frame was initially divided into 4 sections lengthwise, and 2 sections heightwise, the trigger section would be divided into 2 sections lengthwise, and 4 sections heightwise.

In accordance with the forgoing, by reducing the data from eight bits per pixel to one bit per pixel it is possible to provide a trigger signal in one eighth the previously possible time. By using n number of fuzzy comparators simultaneously and in parallel, it is further possible to provide a trigger signal in one nth the time. The processing delay of the apparatus in the present invention is determined by use of very fast switching logic gates and the 12 MHz clock rate of the fuzzy comparators. By processing in parallel, with n fuzzy comparators, the entire process depicted in FIGS. 2A, 2B and 3 can take place in less than 5.5 milliseconds.

Numerous modifications and adaptations will be apparent to those skilled in the art. Thus, the following claims are intended to cover all such modifications and adaptations which fall within the true scope of the present invention.

What is claimed is:

1. A video observation apparatus, comprising:

a video camera;

frame storage means, operatively connected to the video camera, for storing at least one non-current video frame of a viewing field;

dividing means, operatively connected to the frame storage means, for dividing a current video frame of the viewing field and at least one non-current video frame into a plurality of corresponding trigger sections;

a plurality of fuzzy comparator means, operatively connected to the dividing means, each for comparing and detecting a fuzzy logic difference between one trigger section of the current video frame and the corresponding trigger sections of the at least one non-current video frame, the number of fuzzy comparator means being selected so that every trigger section of the current video frame is compared, the fuzzy logic difference being a degree of mismatch; and trigger signal means, operatively connected to the fuzzy comparator means, for providing a trigger signal when a fuzzy logic difference is detected between any of the corresponding current and non-current trigger sections.

2. The video observation apparatus as claimed in claim 1, wherein the non-current video frames are at least one video frame taken immediately prior to the current video frame.

3. The video observation apparatus as claimed in claim 1, wherein the non-current video frames are at least one video frame taken at a time prior to the current video frame with a plurality of video frames between the non-current and current video frames.

4. The video observation apparatus as claimed in claim 1, wherein the trigger signal is provided within four milliseconds of an action which causes the fuzzy logic difference to be detected and thereby the trigger signal to be produced.

5. The video observation apparatus as claimed in claim 1, further comprising:

greatest fuzzy logic difference detecting means, operatively connected to said trigger signal means, for determining in which trigger section was the greatest fuzzy logic difference detected;

motion tracking means, operatively connected to the greatest fuzzy logic difference detecting means, for dividing into corresponding tracking sections the current video frame trigger section and the corresponding at least one non-current video frame trigger section in which the greatest fuzzy logic difference was detected, the number of tracking sections being the same as the number of fuzzy comparator means, the motion tracking means providing one set of corresponding tracking sections to each of the fuzzy comparator means for comparing and detecting a fuzzy logic difference; and tracking signal means, operatively connected to said motion tracking means, for providing a tracking signal which contains information as to which fuzzy comparator means detected a fuzzy logic difference between the corresponding tracking sections.

6. The video observation apparatus as claimed in claim 5, wherein a viewing field is divided lengthwise in a first direction and heightwise in a second direction to determine the trigger sections, and the motion tracking means divides the trigger section lengthwise in the second direction and heightwise in the first direction to determine the tracking sections.

7. A video observation apparatus, comprising:

video observation means for providing a video data stream, wherein each pixel of each frame of a viewing field is provided as multiple bits of data;

data reducing means for reducing each set of multiple bits of data which correspond to each pixel to one bit of binary data based on whether the pixel has a level of grey which is above or below a threshold level of grey;

frame storage means for storing at least one non-current data reduced video frame of the viewing field;

a comparator means for comparing and detecting a fuzzy logic difference between the reduced data of a current video frame and the reduced data of the at least one non-current video frames, the fuzzy logic difference being a degree of mismatch; and trigger signal means for providing a trigger signal when the fuzzy logic difference is detected between any of the reduced data of the current and non-current video frames.

8. The video observation apparatus as claimed in claim 7, wherein the non-current video frames are at least two data reduced video frames taken immediately prior to the current video frame.

9. The video observation apparatus as claimed in claim 7, wherein the non-current video frames are at least two data reduced video frames taken at a time prior to the current video frame with a plurality of video frames between the non-current and current video frames.

10. A video observation method, comprising the steps of:

storing at least one non-current data-reduced video frame of a viewing field;

dividing a current data-reduced video frame of said viewing field and said at least one non-current data-reduced video frame into a plurality of corresponding trigger sections;

using a plurality of fuzzy comparators to compare and detect a fuzzy logic difference between each trigger section of the current video frame and the corresponding trigger sections of the at least one non-current video frame, the fuzzy logic difference being a degree of mismatch; and providing a trigger signal when a fuzzy logic difference is detected between any of the corresponding current and non-current trigger sections.

11. The video observation method as claimed in claim 10, wherein the non-current video frames are at least two data-reduced video frames taken immediately prior to the current video frame.

12. The video observation method as claimed in claim 10, wherein the non-current video frames are at least two data-reduced video frames taken at a time prior to the current video frame with a plurality of video frames between the non-current and current video frames.

13. The video observation method as claimed in claim 11, wherein the trigger signal is provided within milliseconds of an action which causes the fuzzy logic difference to be detected and thereby the trigger signal to be produced.

14. The video observation method as claimed in claim 11, further comprising the steps of:

determining in which trigger section the greatest fuzzy logic difference detected;

dividing into corresponding tracking sections the current video frame trigger section and the corresponding at least one non-current video frame trigger section in which the greatest fuzzy logic difference was detected, the number of tracking sections being the same as the number of fuzzy comparator means;

using the plurality of fuzzy comparators to compare and detect a fuzzy logic difference between each tracking section of the current video frame and the corresponding tracking sections of the at least one non-current video frame; and providing a tracking signal which contains information on which of the corresponding tracking sections detected a fuzzy logic difference.

15. The video observation method as claimed in claim 14, wherein the viewing field is divided lengthwise in a first direction and heightwise in a second direction to arrive at the trigger sections, and the trigger section in which the greatest fuzzy logic difference is detected is divided lengthwise in the second direction and heightwise in the first direction to arrive at the tracking sections.

16. The video observation method as claimed in claim 10, further comprising the steps of:

providing a video data stream, wherein each pixel of each frame of the viewing field is provided as multiple bits of data; and reducing each set of multiple bits of data which correspond to each pixel to one bit of binary data based on whether the pixel has a level of grey which is above or below a threshold level of grey, the data being reduced before being compared by the comparator means.

17. A video observation method, comprising the steps of:

providing a video data stream, wherein each pixel of each frame of a viewing field is provided as multiple bits of data;

reducing each set of multiple bits of data which correspond to each pixel to one bit of binary data based on whether the pixel has a level of grey which is above or below a threshold level of grey;

storing at least one non-current video frame of the viewing field;

comparing and detecting a fuzzy logic difference between the reduced data of a current and the reduced data of the at least one non-current video frames, the fuzzy logic difference being a degree of mismatch; and providing a trigger signal when the fuzzy logic difference is detected between any of the reduced data of the current and non-current video frames.

\* \* \* \* \*